United States Patent
Sun et al.

(10) Patent No.: US 9,546,105 B2
(45) Date of Patent: *Jan. 17, 2017

(54) NEAR-INFRARED LIGHT ABSORBING GLASS, ELEMENT AND FILTER

(71) Applicant: CDGM GLASS CO., LTD., Chengdu, Sichuan (CN)

(72) Inventors: Wei Sun, Chengdu (CN); Bo Kuang, Chengdu (CN); Yu Deng, Chengdu (CN); Dongjun Wang, Chengdu (CN)

(73) Assignee: CDGM GLASS CO., LTD, Sichuan (CN)

( * ) Notice: Subject to any disclaimer, the term of this patent is extended or adjusted under 35 U.S.C. 154(b) by 171 days.

This patent is subject to a terminal disclaimer.

(21) Appl. No.: 14/379,113

(22) PCT Filed: Feb. 4, 2013

(86) PCT No.: PCT/CN2013/071338
§ 371 (c)(1),
(2) Date: Aug. 15, 2014

(87) PCT Pub. No.: WO2013/120421
PCT Pub. Date: Aug. 22, 2013

(65) Prior Publication Data
US 2015/0329411 A1 Nov. 19, 2015

(30) Foreign Application Priority Data

Feb. 17, 2012 (CN) .......................... 2012 1 0036840
Feb. 17, 2012 (CN) .......................... 2012 1 0036873

(51) Int. Cl.
C03C 4/08 (2006.01)
C03C 3/247 (2006.01)
G02B 5/20 (2006.01)

(52) U.S. Cl.
CPC ............. *C03C 4/082* (2013.01); *C03C 3/247* (2013.01); *G02B 5/208* (2013.01)

(58) Field of Classification Search
CPC ......... C03C 4/082; C03C 3/247; G02B 5/208; G02B 5/22; G02B 5/226
See application file for complete search history.

(56) References Cited

U.S. PATENT DOCUMENTS

| 5,242,868 A | 9/1993 | Hara | |
|---|---|---|---|
| 6,225,244 B1* | 5/2001 | Oguma | C03C 3/16 501/45 |
| 2004/0082460 A1* | 4/2004 | Yamane | C03C 3/16 501/48 |
| 2009/0247386 A1* | 10/2009 | Ikenishi | C03C 4/082 501/44 |
| 2009/0247387 A1* | 10/2009 | Ikenishi | C03C 3/247 501/44 |
| 2012/0241697 A1 | 9/2012 | Ohkawa et al. | |
| 2013/0135714 A1* | 5/2013 | Kondo | C03C 3/247 359/359 |
| 2013/0214218 A1* | 8/2013 | Sun | C03C 4/082 252/587 |

FOREIGN PATENT DOCUMENTS

| CN | 102557434 A | 7/2012 | |
|---|---|---|---|
| CN | 102603188 A | 7/2012 | |
| CN | 102603189 A | 7/2012 | |
| JP | 10-101370 | 4/1998 | |
| JP | WO 2012018026 A1 * | 2/2012 | ............ C03C 3/247 |
| WO | WO 2011/071157 A1 | 6/2011 | |

OTHER PUBLICATIONS

Derwent Abstract 2012-M39853 and machine translation of JP2015-513511W, Jul. 25, 2012.*
International Preliminary Report on Patentability issued in International Application No. PCT/CN2013/071338 issued Aug. 19, 2014.
International Search Report issued in International Application No. PCT/CN2013/071338 mailed May 9, 2013.

* cited by examiner

*Primary Examiner* — Elizabeth A Bolden
(74) *Attorney, Agent, or Firm* — Oliff PLC

(57) ABSTRACT

Provided is a near-infrared light absorbing glass with a near-infrared light absorbing element and a near-infrared light absorbing filter. When the length of the near-infrared light absorbing glass is 1 mm, transmissivity is more than 80% at the wavelength of 400 nm, and more than 85% at the wavelength of 500 nm. The near-infrared light absorbing glass contains $P^{5+}$, $Al^{3+}$, $Li^+$, $R^{2+}$ and $Cu^{2+}$ represented by positive ions, wherein $R^{2+}$ represents $Mg^{2+}$, $Ca^{2+}$, $Sr^{2+}$ and $Ba^{2+}$. Meanwhile, the near-infrared light absorbing glass contains $O^{2-}$ and $F^-$ represented by negative ions. Water durability ($D_W$) of the near-infrared light absorbing glass reaches Class 1 and acid durability ($D_A$) reaches above Class 4. In this invention, fluorphosphate glass is used as the matrix glass and the components are designed specially, so that the melting temperature of glass can be effectively lowered and the chemical stability of the glass can be excellent.

27 Claims, 1 Drawing Sheet

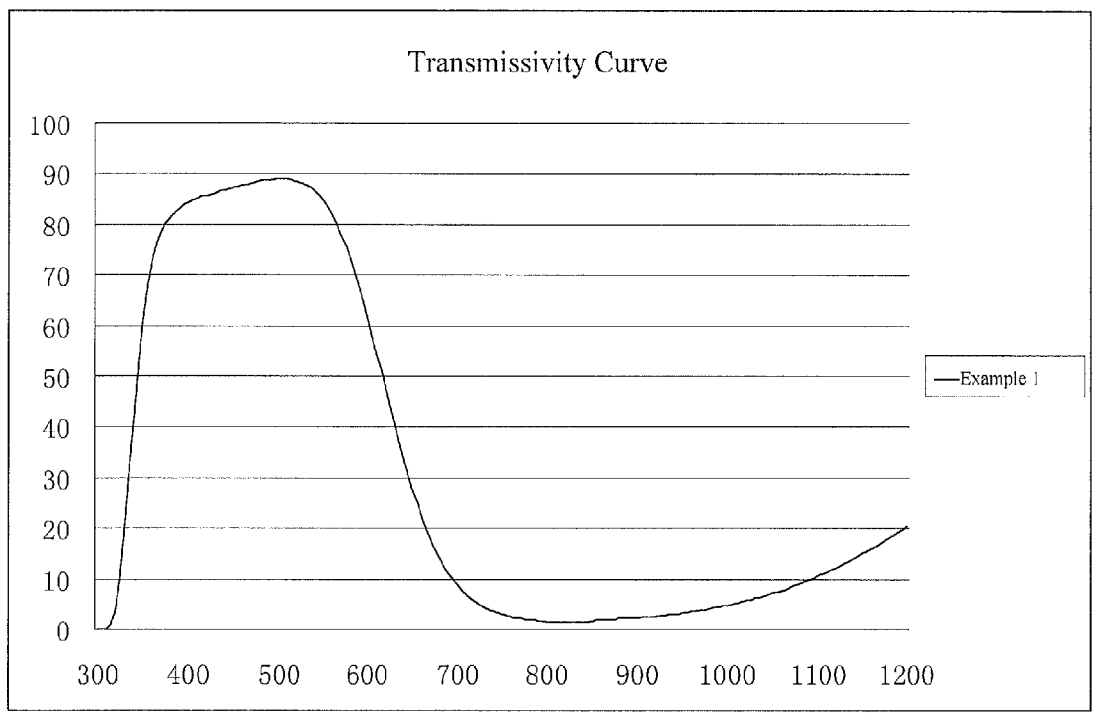

NEAR-INFRARED LIGHT ABSORBING GLASS, ELEMENT AND FILTER

TECHNICAL FIELD

The invention relates to a near-infrared light absorbing glass, a near-infrared light absorbing element and a near-infrared light absorbing filter. Particularly, the invention relates to a near-infrared light absorbing glass for near-infrared light absorbing filters suitable for correction of chromatic sensitivity, a near-infrared light absorbing element formed of the glass, and a near-infrared light absorbing filter formed of the glass.

RELATED ART

In recent years, with the coverage scope of spectral sensitivity of semisolid photographing elements such as CCD and CMOS for digital cameras VTR cameras ranging from the visible range to the near-infrared region (near the wavelength of 1,100 nm), filters absorbing the light from the near-infrared light region can realize a visibility similar to human visibility. Therefore, the demand for filters for correction of chromatic sensitivity is growing, thus resulting in higher requirements on near-infrared light absorbing glass used to manufacture such filters. In other words, such glass is required to be supplied in a large amount but at low cost with having a good stability.

In the prior art, the near-infrared light absorbing glass is formed by adding $Cu^{2+}$ into phosphate or fluorphosphate. However, compared with fluorphosphate glass, phosphate glass has an inferior chemical stability, which will cause cracks and whitish turbidness on the glass surface in case of being exposed in a high-temperature and high-humidity environment for a long time.

DISCLOSURE OF THE INVENTION

A technical problem to be solved by the invention is to provide an environment-friendly near-infrared light absorbing glass with better homogeneity and excellent transmissivity in visible region, a near-infrared light absorbing element, and a near-infrared light absorbing filter.

To solve the technical problem, the invention provides the near-infrared light absorbing glass. When the length of the said near-infrared light absorbing glass is 1 mm, the transmissivity is more than 80% at the wavelength of 400 nm, and more than 85% at the wavelength of 500 nm. The said near-infrared light absorbing glass contains $P^{5+}$, $Al^{3+}$, $Li^+$, $R^{2+}$ and $Cu^{2+}$ represented by positive ions, wherein $R^{2+}$ represents $Mg^{2+}$, $Ca^{2+}$, $Sr^{2+}$ and $Ba^{2+}$. Meanwhile, the said near-infrared light absorbing glass contains $O^{2-}$ and $F^-$ represented by negative ions. Water durability ($D_W$) of the said near-infrared light absorbing glass reaches Class 1 and acid durability ($D_A$) reaches above Class 4.

Furthermore, the transmissivity of said near-infrared light absorbing glass is higher than 88% at the wavelength of 400 nm and higher than 90% at the wavelength of 500 nm in case the thickness is 1 mm.

Furthermore, the content of $F^-$ is more than that of $O^{2-}$.
Furthermore, the content of $F^-$—$O^{2-}$ is 0.1 to 20%.
Furthermore, the content of $F^-$—$O^{2-}$ is 0.1 to 10%.
Furthermore, the content of $F^-$—$O^{2-}$ is 0.1 to 3%.
Furthermore, the near-infrared light absorbing glass comprises 15 to 35% of $P^{5+}$, 5 to 20% of $Al^{3+}$, 1 to 30% of $Li^+$, 0 to 10% of $Na^+$, 0 to 3% of $K^+$, 0.1 to 8% of $Cu^{2+}$, 30 to 65% of $R^{2+}$ (representing $Mg^{2+}$, $Ca^{2+}$, $Sr^{2+}$ and $Ba^{2+}$), 45 to 60% of $F^-$ and 40 to 55% of $O^{2-}$.

Furthermore, the near-infrared light absorbing glass comprises 20 to 30% of $P^{5+}$, 10 to 15% of $Al^{3+}$, 1 to 15% of $Li^+$, 0 to 5% of $Na^+$, 0 to 3% of $K^+$, 1.2 to 5% of $Cu^{2+}$, 40 to 65% of $R^{2+}$, 48 to 57% of $F^-$ and 43 to 52% of $O^{2-}$.

Furthermore, the near-infrared light absorbing glass comprises 21 to 25% of $P^{5+}$, 10 to 15% of $Al^{3+}$, 1 to 10% of $Li^+$, 0.5 to 3% of $Na^+$, 0 to 3% of $K^+$, 1.2 to 3% of $Cu^{2+}$, more than 50% but less than or equal to 65% of $R^{2+}$, more than 50% but less than or equal to 57% of $F^-$, and more than or equal to 43% but less than 50% of $O^{2-}$.

Furthermore, the near-infrared light absorbing glass comprises 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, 54 to 65% of $R^{2+}$, 51 to 55% of $F^-$ and 45 to 49% of $O^{2-}$.

Furthermore, the near-infrared light absorbing glass comprises 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, 54 to 60% of $R^{2+}$, 51 to 53% of $F^-$ and 47 to 49% of $O^{2-}$.

Furthermore, the near-infrared light absorbing glass comprises 15 to 35% of $P^{5+}$, 5 to 20% of $Al^{3+}$, 1 to 30% of $Li^+$, 0 to 10% of $Na^+$, 0 to 3% of $K^+$, 0.1 to 8% of $Cu^{2+}$, 0.1 to 10% of $Mg^{2+}$, 1 to 20% of $Ca^{2+}$, 15 to 35% of $Sr^{2+}$, 10 to 30% of $Ba^{2+}$, 45 to 60% of $F^-$ and 40 to 55% of $O^{2-}$.

Furthermore, the near-infrared light absorbing glass comprises 20 to 30% of $P^{5+}$, 10 to 15% of $Al^{3+}$, 1 to 15% of $Li^+$, 0 to 5% of $Na^+$, 0 to 3% of $K^+$, 1.2 to 5% of $Cu^{2+}$, 2 to 8% of $Mg^{2+}$, 5 to 15% of $Ca^{2+}$, 21 to 30% of $Sr^{2+}$, 15 to 30% of $Ba^{2+}$, 48 to 57% of $F^-$ and 43 to 52% of $O^{2-}$.

Furthermore, the near-infrared light absorbing glass comprises 21 to 25% of $P^{5+}$, 10 to 15% of $Al^{3+}$, 1 to 10% of $Li^+$, 0.5 to 3% of $Na^+$, 0 to 3% of $K^+$, 1.2 to 3% of $Cu^{2+}$, 3 to 7% of $Mg^{2+}$, 7 to 11% of $Ca^{2+}$, 23 to 28% of $Sr^{2+}$, 21 to 30% of $Ba^{2+}$, more than 50% but less than or equal to 57% of $F^-$, and more than or equal to 43% but less than 50% of $O^{2-}$.

Furthermore, the near-infrared light absorbing glass comprises 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, 3 to 7% of $Mg^{2+}$, 7 to 11% of $Ca^{2+}$, 23 to 28% of $Sr^{2+}$, 21 to 25% of $Ba^{2+}$, 51 to 55% of $F^-$ and 45 to 49% of $O^{2-}$.

Furthermore, the near-infrared light absorbing glass comprises 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, 3 to 7% of $Mg^{2+}$, 7 to 11% of $Ca^{2+}$, 23 to 28% of $Sr^{2+}$, 21 to 25% of $Ba^{2+}$, 51 to 53% of $F^-$ and 47 to 49% of $O^{2-}$.

The near-infrared light absorbing glass, comprising 15 to 35% of $P^{5+}$, 5 to 20% of $Al^{3+}$, 1 to 30% of $Li^+$, 0 to 10% of $Na^+$, 0 to 3% of $K^+$, 0.1 to 8% of $Cu^{2+}$, 30 to 65% of $R^{2+}$ (representing $Mg^{2+}$, $Ca^{2+}$, $Sr^{2+}$ and $Ba^{2+}$), 45 to 60% of $F^-$ and 40 to 55% of $O^{2-}$.

Furthermore, the near-infrared light absorbing glass comprises 20 to 30% of $P^{5+}$, 10 to 15% of $Al^{3+}$, 1 to 15% of $Li^+$, 0 to 5% of $Na^+$, 0 to 3% of $K^+$, 1.2 to 5% of $Cu^{2+}$, 40 to 65% of $R^{2+}$, 48 to 57% of $F^-$ and 43 to 52% of $O^{2-}$.

Furthermore, the near-infrared light absorbing glass comprises 21 to 25% of $P^{5+}$, 10 to 15% of $Al^{3+}$, 1 to 10% of $Li^+$, 0.5 to 3% of $Na^+$, 0 to 3% of $K^+$, 1.2 to 3% of $Cu^{2+}$, more than 50% but less than or equal to 65% of $R^{2+}$, more than 50% but less than or equal to 57% of $F^-$, and more than or equal to 43% but less than 50% of $O^{2-}$.

Furthermore, the near-infrared light absorbing glass comprises 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, 54 to 65% of $R^{2+}$, 51 to 55% of $F^-$ and 45 to 49% of $O^{2-}$.

Furthermore, the near-infrared light absorbing glass comprises 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, 54 to 60% of $R^{2+}$, 51 to 53% of $F^-$ and 47 to 49% of $O^{2-}$.

Furthermore, the near-infrared light absorbing glass comprises 15 to 35% of $P^{5+}$, 5 to 20% of $Al^{3+}$, 1 to 30% of $Li^+$, 0 to 10% of $Na^+$, 0 to 3% of $K^+$, 0.1 to 8% of $Cu^{2+}$, 0.1 to 10% of $Mg^{2+}$, 1 to 20% of $Ca^{2+}$, 15 to 35% of $Sr^{2+}$, 10 to 30% of $Ba^{2+}$, 45 to 60% of $F^-$ and 40 to 55% of $O^{2-}$.

Furthermore, the near-infrared light absorbing glass comprises 20 to 30% of $P^{5+}$, 10 to 15% of $Al^{3+}$, 1 to 15% of $Li^+$, 0 to 5% of $Na^+$, 0 to 3% of $K^+$, 1.2 to 5% of $Cu^{2+}$, 2 to 8% of $Mg^{2+}$, 5 to 15% of $Ca^{2+}$, 21 to 30% of $Sr^{2+}$, 15 to 30% of $Ba^{2+}$, 48 to 57% of $F^-$ and 43 to 52% of $O^{2-}$.

Furthermore, the near-infrared light absorbing glass comprises 21 to 25% of $P^{5+}$, 10 to 15% of $Al^{3+}$, 1 to 10% of $Li^+$, 0.5 to 3% of $Na^+$, 0 to 3% of $K^+$, 1.2 to 3% of $Cu^{2+}$, 3 to 7% of $Mg^{2+}$, 7 to 11% of $Ca^{2+}$, 23 to 28% of $Sr^{2+}$, 21 to 30% of $Ba^{2+}$, more than 50% but less than or equal to 57% of $F^-$, and more than or equal to 43% but less than 50% of $O^{2-}$.

Furthermore, the near-infrared light absorbing glass comprises 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, 3 to 7% of $Mg^{2+}$, 7 to 11% of $Ca^{2+}$, 23 to 28% of $Sr^{2+}$, 21 to 25% of $Ba^{2+}$, 51 to 55% of $F^-$ and 45 to 49% of $O^{2-}$.

Furthermore, the near-infrared light absorbing glass comprises 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, 3 to 7% of $Mg^{2+}$, 7 to 11% of $Ca^{2+}$, 23 to 28% of $Sr^{2+}$, 21 to 25% of $Ba^{2+}$, 51 to 53% of $F^-$ and 47 to 49% of $O^{2-}$.

The near-infrared light absorbing element is formed of the near-infrared light absorbing glass.

The near-infrared light absorbing filter is formed of the near-infrared light absorbing glass.

The near-infrared light absorbing glass provided by the invention is advantageous in that fluorphosphate glass is used as the matrix glass and the components are designed specially, so that the melting temperature of glass can be effectively lowered and the chemical stability of the glass can be excellent (the water durability $D_W$ reaches Class 1 and the acid durability $D_A$ reaches Class 4 or above); In this invention, the content of $F^-$ is appropriately increased in the fluorphosphate matrix glass, and the content of $F^-$ is greater than that of $O^{2-}$, so that the melting temperature of the glass can be lowered effectively and excellent chemical stability of the glass can be realized. In the invention, the content of $R^{2+}$ is increased in the fluorphosphate matrix glass to increase the alkaline content of molten glass to prevent reducing $Cu^{2+}$ to $Cu^+$, thus realizing excellent near-infrared light absorption property of the glass. The transmissivity of the glass provided by the invention is higher than 80% at the wavelength of 400 nm and higher than 85% at the wavelength of 500 nm in case the thickness is 1 mm. And the range of the wavelength corresponding to 50% transmissivity (i.e. the wavelength corresponding to $\lambda_{50}$) in the spectral transmissivity within the wavelength range of 500 nm to 700 nm is 615±10 nm.

BRIEF DESCRIPTION OF THE DRAWINGS

FIG. 1 is a curve graph of the spectral transmissivity of the near-infrared light absorbing glass in Example 1 of the invention.

SPECIFIC EMBODIMENTS

The near-infrared light absorbing glass provided by the invention is obtained through using fluorphosphate glass as the matrix glass and adding $Cu^{2+}$ capable of absorbing the near-infrared light.

The content of positive ions hereinafter is represented by the weight percentage of said positive ions in the total positive ions, and the content of negative ions hereinafter is represented by the weight percentage of said negative ions in the total negative ions.

As an elementary component of fluorphosphate glass, $P^{5+}$ is an essential component for realizing absorption in the infrared region of $Cu^{2+}$. When the content of $P^{5+}$ is less than 15%, the chromatic correction is liable to be poor and the color is liable to become green; however, when the content is more than 35%, both the weather resistance and the devitrification resistance of the glass are liable to be degraded; therefore, the content of $P^{5+}$ is 15 to 35%, preferably 20 to 30%, more preferably 21 to 25%.

$Al^{3+}$ is a component for improving the vitrification resistance, weather resistance, thermal shock resistance, mechanical strength and chemical durability of fluorphosphate glass. When the content of $Al^{3+}$ is less than 5%, the preceding effects are unavailable; however, if the content exceeds 20%, the near-infrared light absorption property will be weakened. Therefore, the content of $Al^{3+}$ is 5 to 20%, more preferably 10 to 15%.

$Li^+$, $Na^+$ and $K^+$ are components for improving the melting behavior, glass forming property and transmissivity of the glass in the visible light region. With respect to $Na^+$ and $K^+$, a little amount of $Li^+$ can realize a better chemical stability of the glass. However, when the content of $Li^+$ exceeds 30%, the durability and workability of the glass are liable to be degraded. Therefore, the content of $Li^+$ is 1 to 30%, preferably 1 to 15%, more preferably 1 to 10%, further preferably 2 to 5%.

In the invention, a little amount of $Na^+$ and $Li^+$ can also preferably be added to melt together, thus effectively improving the weather resistance of the glass. The content of $Na^+$ is 0 to 10%, preferably 0 to 5%, more preferably 0.5 to 3%. The content of $K^+$ is 0 to 3%, and the durability of the glass is liable to be degraded in case the content of $K^+$ is more than 3%.

$R^{2+}$ is a component capable of effectively improving the glass forming property, devitrification resistance and workability of the glass, and $R^{2+}$ here represents $Mg^{2+}$, $Ca^{2+}$, $Sr^{2+}$ and $Ba^{2+}$. The near-infrared light absorbing filter is expected to have a high transmissivity in the visible region. To improve the transmissivity in the visible region, copper ions are required to be introduced in the form of $Cu^{2+}$ rather than $Cu^+$. In case molten glass is in a reduced status, $Cu^{2+}$ is liable to be reduced to $Cu^+$, which will result in transmissivity reduction of the glass near the wavelength of 400 nm. In the invention, the total content of $Mg^{2+}$, $Ca^{2+}$, $Sr^{2+}$ and $Ba^{2+}$ is increased appropriately to increase the alkaline content of molten glass to prevent reducing $Cu^{2+}$ to $Cu^+$, thus realizing excellent near-infrared light absorption property of the glass. However, when the total content of $Mg^{2+}$, $Ca^{2+}$, $Sr^{2+}$ and $Ba^{2+}$ is less than 30%, the devitrification resistance is liable to be poor; and when the total content exceeds 65%, the devitrification resistance is also liable to be poor. Therefore, the total content of $Mg^{2+}$, $Ca^{2+}$, $Sr^{2+}$ and $Ba^{2+}$ is 30 to 65%, preferably 40 to 65%, more preferably more than 50% but less than or equal to 65%, further preferably 54 to 65%, most preferably 54 to 60%.

Among, $Mg^{2+}$ and $Ca^{2+}$ can improve the devitrification resistance, chemical stability and workability of the glass. The content of $Mg^{2+}$ is preferably 0.1 to 10%, more preferably 2 to 8%, further preferably 3 to 7%. The content of $Ca^{2+}$ is preferably 1 to 20%, more preferably 5 to 15%, further preferably 7 to 11%.

With respect to $Mg^{2+}$ and $Ca^{2+}$, the components of the glass provided by the invention are mainly added with a large amount of $Sr^{2+}$ and $Ba^{2+}$. In addition to effectively increasing the content of $R^{2+}$ and improving the transmissivity, $Sr^{2+}$ and $Ba^{2+}$ can also improve the glass forming property, devitrification resistance and melting behavior of the glass. Therefore, the content of $Sr^{2+}$ is preferably 15 to 35%, more preferably 21 to 30%, further preferably 23 to 28%. For the same reason, the content of $Ba^{2+}$ is preferably 10 to 30%, more preferably 15 to 30%, further preferably 21 to 30%, most preferably 21 to 25%.

Copper in the glass is a key indicator of the near-infrared light absorption property, which exists in the form of $Cu^{2+}$ in the glass. When the content of $Cu^{2+}$ is less than 0.1%, the near-infrared light absorption property is liable to be poor; however, when the content exceeds 8%, the devitrification resistance of the glass is liable to be weakened. Thus, the content of $Cu^{2+}$ is 0.1 to −8%, preferably 1.2 to −5%, more preferably 1.2 to −3%.

The glass provided by the invention contains negative ions components $O^{2-}$ and F−. In the near-infrared light absorbing glass, when the melting temperature rises, $Cu^{2+}$ is liable to be reduced to $Cu^+$ and the color of the glass is liable to change from blue to green, which damages the characteristics necessary for applying the correction of chromatic sensitivity to semiconductor imaging elements.

$F^-$ is an essential anionic component for lowering the melting temperature and improving the chemical stability of the glass. In the invention, when the content of $F^-$ is less than or equal to 45%, the chemical stability is liable to be poor; however, when the content of $F^-$ exceeds 60%, the reduction of $Cu^{2+}$ is liable to be unrestrained, the content of Cu+ in the glass is liable to be increased, the light absorption at a short wavelength is liable to be increased and the infrared light absorption is liable to be reduced due to reduction of $O^{2-}$ content. Therefore, the content of F− is 45 to 60%, preferably 48 to 57%, more preferably more than 50% but less than or equal to 57%, further preferably 51 to 55%, most preferably 51 to 53%.

$O^{2-}$ is an essential anionic component in the glass provided by the invention. When the content of $O^{2-}$ is too little, the absorption in the short wavelength region, particularly near the wavelength of 400 nm, is liable to be higher till the color becomes green due to the fact that $Cu^{2+}$ is reduced to $Cu^+$; however, when the content of $O^{2-}$ is excessive, the viscosity of the glass is liable to be higher, thus resulting in a higher melting temperature and transmissivity reduction. Therefore, the content of $O^{2-}$ in the invention is 40 to 55%, preferably 43 to 52%, more preferably more than or equal to 43% but less than 50%, further preferably 45 to 49%, more preferably 47 to 49%.

In this invention, the content of $F^-$ is appropriately increased, and the content of $F^-$ is greater than that of $O^{2-}$, so that the melting temperature of the glass can be lowered effectively; besides, an appropriate increase of $F^-$ can also realize excellent chemical stability of the glass. Therefore, the content of $F^-$ is preferably 0.1 to 20%, further preferably 0.1 to 10%, most preferably 0.1 to 3%.

Based on specific component design, the glass provided by the invention has the following features in chemical stability: the water durability $D_W$ is available to Class 1; and the acid durability $D_A$ can reach Class 4, preferably Class 3 and more preferably Class 2.

The water durability $D_W$ (powdered method) is calculated as per the testing method specified in GB/T17129 according to the following Formula:

$$D_W = (B-C)/(B-A)*100$$

Wherein $D_W$ represents the leaching percentage of the glass (%);
B represents the mass of the filter and the sample (g);
C represents the mass of the filter and the eroded sample (g); and
A represents the mass of the filter (g).

The water durability $D_W$ of the optical glass is classified as six categories as per the leaching percentage calculated out.

| | Category | | | | | |
|---|---|---|---|---|---|---|
| | 1 | 2 | 3 | 4 | 5 | 6 |
| Leaching Percentage (Dw) | <0.04 | 0.04-0.10 | 0.10-0.25 | 0.25-0.60 | 0.60-1.10 | >1.10 |

The acid durability $D_A$ (powdered method) is calculated as per the testing method specified in GB/T17129 according to the following Formula:

$$D_A = (B-C)/(B-A)*100$$

Wherein $D_A$ represents the leaching percentage of the glass (%);
B represents the mass of the filter and the sample (g);
C represents the mass of the filter and the eroded sample (g); and
A represents the mass of the filter (g).

The acid durability $D_A$ of the optical glass is classified as six categories as per the leaching percentage calculated out.

| | Category | | | | | |
|---|---|---|---|---|---|---|
| | 1 | 2 | 3 | 4 | 5 | 6 |
| Leaching Percentage ($D_A$) | <0.20 | 0.20-0.35 | 0.35-0.65 | 0.65-1.20 | 1.20-2.20 | >2.20 |

The optimal transmissivity properties of the glass provided by the invention are as follows:

When the glass is 1 mm thick, the spectral transmissivity within the wavelength range of 400 nm to 1,200 nm has the following properties.

The spectral transmissivity at the wavelength of 400 nm is higher than or equal to 80%, preferably higher than or equal to 85%, more preferably higher than or equal to 88%.

The spectral transmissivity at the wavelength of 500 nm is higher than or equal to 85%, preferably higher than or equal to 88%, more preferably higher than or equal to 90%.

The spectral transmissivity at the wavelength of 600 nm is higher than or equal to 58%, preferably higher than or equal to 61%, more preferably higher than or equal to 64%.

The spectral transmissivity at the wavelength of 700 nm is lower than or equal to 12%, preferably lower than or equal to 10%, more preferably lower than or equal to 9%.

The spectral transmissivity at the wavelength of 800 nm is lower than or equal to 5%, preferably lower than or equal to 3%, more preferably lower than or equal to 2.5%, further more preferably lower than or equal to 2%.

The spectral transmissivity at the wavelength of 900 nm is lower than or equal to 5%, preferably lower than or equal to 3%, more preferably lower than or equal to 2.5%.

The spectral transmissivity at the wavelength of 1,000 nm is lower than or equal to 7%, preferably lower than or equal to 6%, more preferably lower than or equal to 5%.

The spectral transmissivity at the wavelength of 1,100 nm is lower than or equal to 15%, preferably lower than or equal to 13%, more preferably lower than or equal to 11%.

The spectral transmissivity at the wavelength of 1,200 nm is lower than or equal to 24%, preferably lower than or equal to 22%, more preferably lower than or equal to 21%.

It is thus clear that the absorption within the 700-1,200 wavelength range of near-infrared region is strong, and that within the 400-600 wavelength range of visible region is weak.

In the spectral transmissivity within the wavelength range of 500 nm to 700 nm, the range of the wavelength corresponding to 50% transmissivity (i.e. the wavelength corresponding to $\lambda_{50}$) is 615±10 nm.

The transmissivity of the glass provided by the invention is a value calculated with a spectrophotometer as per the preceding method. The glass sample is assumed to have two parallel planes polished optically, the light falls perpendicularly from one parallel plane and emerges from the other parallel plane, then the transmissivity will be obtained via dividing the intensity of emergent light by the intensity of incident light. The transmissivity here is also called external transmissivity.

The preceding property of the glass can excellently realize chromatic correction of semiconductor imaging elements such as CCD or CMOS.

The near-infrared light absorbing element provided by the invention is formed of the near-infrared light absorbing glass, applicable to laminar glass elements or lenses in near-infrared light absorbing filters, suitable for chromatic correction of solid photographing elements, having good transmissivity and chemical stability.

The near-infrared light absorbing filter provided by the invention is formed of the near-infrared light absorbing glass, thus also having good transmissivity and chemical stability.

EXAMPLES

The invention will be described in more detail by the following reference examples. However, the invention is not limited to said examples.

Fluoride, metaphosphate, oxide, nitrate and carbonate are used as raw materials of the glass provided by the invention. The optical glass provided by the invention is obtained through the following steps: weighing said raw materials according to the proportions as shown in Tables 1 to 3 and placing into a platinum crucible sealed with a cover after mixing fully, melting at 700 to 900 DEG C, settling and protecting with oxygen simultaneously with conducting homogenization, and then enabling the molten glass to flow out from a temperature-controlled pipe at a constant speed to form the optical glass.

Examples 1 to 20

Examples of Manufacturing the Near-Infrared Light Absorbing Glass

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Positive Ions % | $P^{5+}$ | 27.5 | 24.2 | 19.6 | 21.7 | 22.2 | 23.1 | 21.0 | 25.0 | 18.7 | 25.4 |
| | $Al^{3+}$ | 13.4 | 10 | 15.3 | 11.8 | 8.7 | 12.7 | 12.9 | 10.4 | 15.6 | 11.3 |
| | $Li^+$ | 2.4 | 3.8 | 4.4 | 5.9 | 7.9 | 2.4 | 2.1 | 3.8 | 3.0 | 1.1 |
| | $Na^+$ | 0.6 | 1.4 | 0 | 0 | 0 | 0 | 0 | 1.0 | 1.5 | 0 |
| | $K^+$ | 0 | 0 | 0 | 0 | 0.5 | 0 | 0 | 0 | 2 | 0 |
| | $R^{2+}$ | 54.4 | 56.2 | 57.4 | 57.9 | 60.3 | 59.6 | 61.1 | 58.0 | 55.8 | 61.2 |
| | $Mg^{2+}$ | 2.8 | 6.8 | 3.6 | 7.2 | 4.4 | 4.6 | 4.8 | 3.9 | 7.1 | 3.1 |
| | $Ca^{2+}$ | 7.1 | 3.9 | 11.5 | 6.9 | 16.1 | 9.9 | 10.5 | 12.5 | 7.7 | 8.4 |
| | $Sr^{2+}$ | 27.6 | 29.1 | 22.7 | 18.9 | 16.1 | 24.8 | 25.1 | 22.7 | 23.4 | 27.1 |
| | $Ba^{2+}$ | 16.9 | 16.4 | 19.6 | 24.9 | 23.7 | 20.3 | 20.7 | 18.9 | 17.6 | 22.6 |
| | $Cu^{2+}$ | 1.7 | 4.4 | 3.3 | 2.7 | 0.4 | 2.2 | 2.9 | 1.8 | 3.4 | 1.0 |
| Total | | 100.0 | 100.0 | 100.0 | 100.0 | 100.0 | 100.0 | 100.0 | 100.0 | 100.0 | 100.0 |
| Negative Ions % | $F^-$ | 52.8 | 54.4 | 53.8 | 55.1 | 51.7 | 51.5 | 52.4 | 51.3 | 52.8 | 50.7 |
| | $O^{2-}$ | 47.2 | 45.6 | 46.2 | 44.9 | 48.3 | 48.5 | 47.6 | 48.7 | 47.2 | 49.3 |
| Total | | 100.0 | 100.0 | 100.0 | 100.0 | 100.0 | 100.0 | 100.0 | 100.0 | 100.0 | 100.0 |
| $D_W$ | | 1 | 1 | 1 | 1 | 1 | 1 | 1 | 1 | 1 | 1 |
| $D_A$ | | 2 | 3 | 3 | 3 | 3 | 3 | 3 | 3 | 2 | 3 |

TABLE 2

| Examples | | 11 | 12 | 13 | 14 | 15 |
|---|---|---|---|---|---|---|
| Positive Ions % | $P^{5+}$ | 23.5 | 22.9 | 20.1 | 21.9 | 23.0 |
| | $Al^{3+}$ | 11.9 | 12.1 | 13.8 | 12.8 | 13.0 |
| | $Li^+$ | 2.5 | 3.0 | 2.4 | 2.0 | 4.1 |
| | $Na^+$ | 1.0 | 0.7 | 0 | 0 | 2.5 |
| | $K^+$ | 0 | 0 | 0 | 0 | 0 |
| | $R^{2+}$ | 59 | 59.1 | 61.2 | 61.3 | 56.2 |
| | $Mg^{2+}$ | 4.9 | 4.3 | 4.6 | 5.3 | 3.3 |
| | $Ca^{2+}$ | 9.1 | 10.2 | 11.1 | 10.9 | 8.5 |
| | $Sr^{2+}$ | 26.2 | 25.1 | 23.9 | 24.2 | 23.7 |
| | $Ba^{2+}$ | 18.8 | 19.5 | 21.6 | 20.9 | 20.7 |
| | Cu | 2.1 | 2.2 | 2.5 | 2.0 | 1.2 |
| Total | | 100.0 | 100.0 | 100.0 | 100.0 | 100.0 |
| Negative Ions % | $F^-$ | 50.6 | 51.1 | 50.8 | 51.9 | 52.5 |
| | $O^{2-}$ | 49.4 | 48.9 | 49.2 | 48.1 | 47.5 |
| Total | | 100.0 | 100.0 | 100.0 | 100.0 | 100.0 |
| $D_W$ | | 1 | 1 | 1 | 1 | 1 |
| $D_A$ | | 4 | 3 | 3 | 4 | 2 |

TABLE 3

| | | Examples | | | | |
|---|---|---|---|---|---|---|
| | | 16 | 17 | 18 | 19 | 20 |
| Positive Ions % | $P^{5+}$ | 23.5 | 22.9 | 20.1 | 21.0 | 23.7 |
| | $Al^{3+}$ | 11.9 | 12.1 | 12.8 | 12.8 | 13.7 |
| | $Li^+$ | 1.8 | 2.3 | 3.4 | 2.9 | 3.7 |
| | $Na^+$ | 1.7 | 1.4 | 0 | 0 | 1.5 |
| | $K^+$ | 0 | 0 | 0 | 0 | 0 |
| | $R^{2+}$ | 59 | 59.1 | 61.2 | 61.3 | 56.2 |
| | $Mg^{2+}$ | 4.9 | 4.3 | 4.6 | 5.3 | 3.3 |
| | $Ca^{2+}$ | 9.1 | 10.2 | 11.1 | 10.9 | 8.5 |
| | $Sr^{2+}$ | 26.2 | 25.1 | 23.9 | 24.2 | 23.7 |
| | $Ba^{2+}$ | 18.8 | 19.5 | 21.6 | 20.9 | 20.7 |
| | $Cu^{2+}$ | 2.1 | 2.2 | 2.5 | 2.0 | 1.2 |
| Total | | 100.0 | 100.0 | 100.0 | 100.0 | 100.0 |
| Negative Ions % | $F^-$ | 47 | 51.8 | 48.4 | 51.3 | 49.1 |
| | $O^{2-}$ | 53 | 48.2 | 51.6 | 48.7 | 50.9 |
| Total | | 100.0 | 100.0 | 100.0 | 100.0 | 100.0 |
| $D_W$ | | 1 | 1 | 1 | 1 | 1 |
| $D_A$ | | 3 | 2 | 2 | 2 | 2 |

$R^+$ in Table 1-3 represents the total content of $Li^+$, $Na^+$ and $K^+$

The preceding glass is processed into plates, two planes opposite to each other are subjected to optical polishing to prepare the samples for measuring the transmissivity. The spectral transmissivity of each sample is measured with the spectrometer to acquire the transmissivity of typical wavelength of each sample with the thickness of 1 mm.

Tables 4 to 6 illustrate the transmissivity of the glass in case the thickness is 1 mm, which indicates that the glass is excellent in chromatic correction of semiconductor imaging elements.

TABLE 4

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Transmissivity (%) | 400 nm | 83 | 85 | 82.5 | 81 | 85 | 81.6 | 83.5 | 88.1 | 83.2 | 88.3 |
| | 500 nm | 88 | 89 | 87 | 88 | 88.1 | 88.3 | 88 | 90.9 | 88 | 90.9 |
| | 600 nm | 63 | 65 | 63 | 62.4 | 61.4 | 63.6 | 64 | 63 | 61.7 | 63 |
| | 700 nm | 10 | 8 | 8.4 | 9 | 8.5 | 9.4 | 8.7 | 8.2 | 8 | 8.1 |
| | 800 nm | 1.5 | 2 | 1.4 | 1.6 | 2.3 | 2.1 | 1.7 | 2.1 | 1.2 | 1.8 |
| | 900 nm | 3 | 3 | 2.5 | 2.2 | 2 | 3 | 2.3 | 2.5 | 2.3 | 2.1 |
| | 1000 nm | 5 | 6 | 5.4 | 4.8 | 4.6 | 4.3 | 5 | 4.2 | 4.4 | 4.5 |
| | 1100 nm | 10.5 | 10.5 | 10.3 | 10.7 | 10.8 | 10.4 | 10.5 | 10.3 | 11.5 | 10.5 |
| | 1200 nm | 21 | 20.4 | 20 | 20.6 | 20.2 | 21 | 20.8 | 20 | 20 | 21 |
| $\lambda_{50}$ (nm) | | 615 | 622 | 614 | 616 | 609 | 615 | 616 | 616 | 618 | 624 |

TABLE 5

| | | Examples | | | | |
|---|---|---|---|---|---|---|
| | | 11 | 12 | 13 | 14 | 15 |
| Transmissivity (%) | 400 nm | 84 | 88.3 | 82.4 | 80.7 | 83 |
| | 500 nm | 88 | 90.8 | 88.1 | 85.6 | 88.2 |
| | 600 nm | 64 | 60.5 | 61.2 | 58.1 | 63.4 |
| | 700 nm | 10.6 | 9.1 | 11.8 | 10 | 10.2 |
| | 800 nm | 2.1 | 3.5 | 3.1 | 4.1 | 2.1 |
| | 900 nm | 5 | 3 | 4 | 3 | 2.5 |
| | 1000 nm | 6.5 | 6.4 | 5 | 4.7 | 6 |
| | 1100 nm | 12 | 13 | 14.2 | 13.4 | 12.5 |
| | 1200 nm | 24 | 23 | 22 | 23.1 | 21 |
| $\lambda_{50}$ (nm) | | 606 | 618 | 617 | 614 | 613 |

TABLE 6

| | | Examples | | | | |
|---|---|---|---|---|---|---|
| | | 16 | 17 | 18 | 19 | 20 |
| Transmissivity (%) | 400 nm | 82 | 82.3 | 81.6 | 82.8 | 83 |
| | 500 nm | 88.5 | 88.4 | 88 | 88 | 88 |
| | 600 nm | 64.5 | 63.2 | 64 | 64.2 | 64.6 |
| | 700 nm | 11.6 | 11 | 10 | 10.1 | 10.2 |
| | 800 nm | 2.2 | 2.4 | 2.3 | 2.3 | 2.1 |
| | 900 nm | 3.3 | 3 | 3.4 | 3 | 3 |
| | 1000 nm | 6.4 | 6.6 | 6 | 6.3 | 6 |
| | 1100 nm | 12.2 | 12.7 | 12 | 12 | 12.6 |
| | 1200 nm | 22.8 | 23.1 | 21 | 22 | 23 |
| $\lambda_{50}$ (nm) | | 617 | 612 | 609 | 624 | 616 |

FIG. 1 is a spectral curve graph of Example 1, with the horizontal ordinate representing the wavelength and the longitudinal coordinate represents the transmissivity. As illustrated in the FIGURE, the transmissivity at the preferable wavelength of 400 nm is higher than 80% in case the glass is 1 mm thick. For the spectral transmissivity within the wavelength range of 500 nm to 700 nm, the range of the wavelength corresponding to 50% transmissivity (i.e. the wavelength corresponding to $\lambda_{50}$) is 615±10 nm. For the spectral transmissivity within the wavelength range of 400 to 1,200 nm, the transmissivity within the range of 800 to 1,000 nm is the lowest. Therefore, such a region is the near-infrared region, wherein the sensitivity of semiconductor imaging elements is not very low, so the transmissivity of filters for chromatic correction shall be restrained, thus reaching a sufficient low level. However, the sensitivity of semiconductor imaging elements is relatively lowered at the wavelength of 1,000 to 1,200 nm, so the transmissivity of the glass provided by the invention is liable to be increased.

The invention claimed is:

1. A near-infrared light absorbing glass, wherein when the near-infrared light absorbing glass is 1 mm thick, the transmissivity is higher than 80% at the wavelength of 400 nm, higher than 85% at the wavelength of 500 nm, and higher than 58% at the wavelength of 600 nm, wherein said near-infrared light absorbing glass contains $P^{5+}$, $Al^{3+}$, $Li^+$, $R^{2+}$ and $Cu^{2+}$ represented by positive ions; $R^{2+}$ represents $Mg^{2+}$, $Ca^{2+}$, $Sr^{2+}$ and $Ba^{2+}$; said near-infrared light absorbing glass also contains $O^{2-}$ and $F^-$ represented by negative ions; and the water durability ($D_W$) of the said near-infrared light absorbing glass reaches Class 1, with the acid durability ($D_A$) above Class 4, and
  wherein the $R^{2+}$ weight is 54-65% based on 100% of cation weight; $F^-$ and $O^{2-}$ comprise 100% of anion weight and $O^{2-}$ comprises at least 40% by anion weight, provided that the content of $F^-$ is more than the $O^{-2}$.

2. The near-infrared light absorbing glass as recited in claim 1, wherein when said near-infrared light absorbing glass is 1 mm thick, the transmissivity is higher than 88% at the wavelength of 400 nm and higher than 90% at the wavelength of 500 nm.

3. The near-infrared light absorbing glass as recited in claim 1, wherein the content of $F^-$ exceeds the content of $O^{-2}$ by 0.1 to 20%.

4. The near-infrared light absorbing glass as recited in claim 1, wherein the content of $F^-$ exceeds the content of $O^{-2}$ by 0.1 to 10%.

5. The near-infrared light absorbing glass as recited in claim 1, wherein the content of $F^-$ exceeds the content of $O^{-2}$ by 0.1 to 3%.

6. The near-infrared light absorbing glass as recited in claim 1, comprising by cation weight: 15 to 35% of $P^{5+}$, 5 to 20% of $Al^{3+}$, 1 to 30% of $Li^+$, 0 to 10% of $Na^+$, 0 to 3% of $K^+$, 0.1 to 8% of $Cu^{2+}$.

7. The near-infrared light absorbing glass as recited in claim 1, comprising by cation weight: 20 to 30% of $P^{5+}$, 10 to 15% of $Al^{3+}$, 1 to 15% of $Li^+$, 0 to 5% of $Na^+$, 0 to 3% of $K^+$, 1.2 to 5% of $Cu^{2+}$, and by anion weight: greater than 50 to 57% of $F^-$ and 43 to less than % of $O^{2-}$.

8. The near-infrared light absorbing glass as recited in claim 1, comprising by cation weight: 21 to 25% of $P^{5+}$, 10 to 15% of $Al^{3+}$, 1 to 10% of $Li^+$, 0.5 to 3% of $Na^+$, 0 to 3% of $K^+$, 1.2 to 3% of $Cu^{2+}$, and by anion weight: more than 50% but less than or equal to 57% of $F^-$, and more than or equal to 43% but less than 50% of $O^{2-}$.

9. The near-infrared light absorbing glass as recited in claim 1, comprising by cation weight: 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, and by anion weight: 51 to 55% of $F^-$ and 45 to 49% of $O^{2-}$.

10. The near-infrared light absorbing glass as recited in claim 1, comprising by cation weight: 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, 54 to 60% of $R^{2+}$, and by anion weight: 51 to 53% of $F^-$ and 47 to 49% of $O^{2-}$.

11. The near-infrared light absorbing glass as recited in claim 1, comprising by cation weight: 15 to 35% of $P^{5+}$, 5 to 20% of $Al^{3+}$, 1 to 30% of $Li^+$, 0 to 10% of $Na^+$, 0 to 3% of $K^+$, 0.1 to 8% of $Cu^{2+}$, 0.1 to 10% of $Mg^{2+}$, 1 to 20% of $Ca^{2+}$, 15 to 35% of $Sr^{2+}$, 10 to 30% of $Ba^{2+}$.

12. The near-infrared light absorbing glass as recited in claim 1, comprising by cation weight: 20 to 30% of $P^{5+}$, 10 to 15% of $Al^{3+}$, 1 to 15% of $Li^+$, 0 to 5% of $Na^+$, 0 to 3% of $K^+$, 1.2 to 5% of $Cu^{2+}$, 2 to 8% of $Mg^{2+}$, 5 to 15% of $Ca^{2+}$, 21 to 30% of $Sr^{2+}$, 15 to 30% of $Ba^{2+}$, and by anion weight: greater than 50 to 57% of $F^-$ and 43 to less than 50% of $O^{2-}$.

13. The near-infrared light absorbing glass as recited in claim 1, comprising by cation weight: 21 to 25% of $P^{5+}$, 10 to 15% of $Al^{3+}$, 1 to 10% of $Li^+$, 0.5 to 3% of $Na^+$, 0 to 3% of $K^+$, 1.2 to 3% of $Cu^{2+}$, 3 to 7% of $Mg^{2+}$, 7 to 11% of $Ca^{2+}$, 23 to 28% of $Sr^{2+}$, 21 to 30% of $Ba^{2+}$, and by anion weight: more than 50% but less than or equal to 57% of $F^-$, and more than or equal to 43% but less than 50% of $O^{2-}$.

14. The near-infrared light absorbing glass as recited in claim 1, comprising by cation weight: 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, 3 to 7% of $Mg^{2+}$, 7 to 11% of $Ca^{2+}$, 23 to 28% of $Sr^{2+}$, 21 to 25% of $Ba^{2+}$, and by anion weight: 51 to 55% of $F^-$ and 45 to 49% of $O^{2-}$.

15. The near-infrared light absorbing glass as recited in claim 1, comprising by cation weight: 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, 3 to 7% of $Mg^{2+}$, 7 to 11% of $Ca^{2+}$, 23 to 28% of $Sr^{2+}$, 21 to 25% of $Ba^{2+}$, and by anion weight: 51 to 53% of $F^-$ and 47 to 49% of $O^{2-}$.

16. A near-infrared light absorbing glass, comprising by cation weight: 15 to 35% of $P^{5+}$, 5 to 20% of $Al^{3+}$, 1 to 30% of $Li^+$, 0 to 10% of $Na^+$, 0 to 3% of $K^+$, 0.1 to 8% of $Cu^{2+}$, 54 to 65% of $R^{2+}$ (representing $Mg^{2+}$, $Ca^{2+}$, $Sr^{2+}$ and $Ba^{2+}$), and by anion weight: 45 to 60% of $F^-$ and 40 to 55% of $O^{2-}$, wherein $F^-$ and $O^{2-}$ comprise 100% of anion weight.

17. The near-infrared light absorbing glass as recited in claim 16, comprising by cation weight: 20 to 30% of $P^{5+}$, 10 to 15% of $Al^{3+}$, 1 to 15% of $Li^+$, 0 to 5% of $Na^+$, 0 to 3% of $K^+$, 1.2 to 5% of $Cu^{2+}$, and by anion weight: 48 to 57% of $F^-$ and 43 to 52% of $O^{2-}$.

18. The near-infrared light absorbing glass as recited in claim 16, comprising by cation weight: 21 to 25% of $P^{5+}$, 10 to 15% of $Al^{3+}$, 1 to 10% of $Li^+$, 0.5 to 3% of $Na^+$, 0 to 3% of $K^+$, 1.2 to 3% of $Cu^{2+}$ and by anion weight: more than 50% but less than or equal to 57% of $F^-$, and more than or equal to 43% but less than 50% of $O^{2-}$.

19. The near-infrared light absorbing glass as recited in claim 16, comprising by cation weight: 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, and by anion weight: 51 to 55% of $F^-$ and 45 to 49% of $O^{2-}$.

20. The near-infrared light absorbing glass as recited in claim 16, comprising by cation weight: 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, 54 to 60% of $R^{2+}$, and by anion weight: 51 to 53% of $F^-$ and 47 to 49% of $O^{2-}$.

21. The near-infrared light absorbing glass as recited in claim 16, comprising by cation weight: 15 to 35% of $P^{5+}$, 5 to 20% of $Al^{3+}$, 1 to 30% of $Li^+$, 0 to 10% of $Na^+$, 0 to 3% of $K^+$, 0.1 to 8% of $Cu^{2+}$, 0.1 to 10% of $Mg^{2+}$, 1 to 20% of $Ca^{2+}$, 15 to 35% of $Sr^{2+}$, 10 to 30% of $Ba^{2+}$.

22. The near-infrared light absorbing glass as recited in claim 16, comprising by cation weight: 20 to 30% of $P^{5+}$, 10 to 15% of $Al^{3+}$, 1 to 15% of $Li^+$, 0 to 5% of $Na^+$, 0 to 3% of $K^+$, 1.2 to 5% of $Cu^{2+}$, 2 to 8% of $Mg^{2+}$, 5 to 15% of $Ca^{2+}$, 21 to 30% of $Sr^{2+}$, 15 to 30% of $Ba^{2+}$, and by anion weight: 48 to 57% of and 43 to 52% of $O^{2-}$.

23. The near-infrared light absorbing glass as recited in claim 16, comprising by cation weight: 21 to 25% of $P^{5+}$, 10 to 15% of $Al^{3+}$, 1 to 10% of $Li^+$, 0.5 to 3% of $Na^+$, 0 to 3% of $K^+$, 1.2 to 3% of $Cu^{2+}$, 3 to 7% of $Mg^{2+}$, 7 to 11% of $Ca^{2+}$, 23 to 28% of $Sr^{2+}$, 21 to 30% of $Ba^{2+}$, and by anion weight: more than 50% but less than or equal to 57% of $F^-$, and more than or equal to 43% but less than 50% of $O^{2-}$.

24. The near-infrared light absorbing glass as recited in claim 16, comprising by cation weight: 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, 3 to 7% of $Mg^{2+}$, 7 to 11% of $Ca^{2+}$, 23 to 28% of $Sr^{2+}$, 21 to 25% of $Ba^{2+}$, and by anion weight: 51 to 55% of $F^-$ and 45 to 49% of $O^{2-}$.

25. The near-infrared light absorbing glass as recited in claim 16, comprising by cation weight: 21 to 25% of $P^{5+}$, 10 to 15% of $Al^{3+}$, 2 to 5% of $Li^+$, 0.5 to 3% of $Na^+$, 0 to 3% of $K^+$, 1.2 to 3% of $Cu^{2+}$, 3 to 7% of $Mg^{2+}$, 7 to 11% of $Ca^{2+}$, 23 to 28% of $Sr^{2+}$, 21 to 25% of $Ba^{2+}$, and by anion weight: 51 to 53% of $F^-$ and 47 to 49% of $O^2$.

26. A near-infrared light absorbing element, which is formed of the near-infrared light absorbing glass as recited in claim 1.

27. A near-infrared light absorbing filter, which is formed of the near-infrared light absorbing glass as recited in claim 1.

* * * * *